United States Patent [19]
Matthews

[11] 3,709,430
[45] Jan. 9, 1973

[54] BIORYTHMIC INDICATOR
[75] Inventor: Bernard John Matthews, Palo Alto, Calif.
[73] Assignee: The Raymond Lee Organization, Inc., New York, N.Y.
[22] Filed: Oct. 23, 1970
[21] Appl. No.: 83,428

[52] U.S. Cl. .................................................235/109
[51] Int. Cl. ..............................................G06c 27/00
[58] Field of Search ...235/83, 113, 120, 109, 85 RC, 235/1 B

[56] References Cited
UNITED STATES PATENTS

| 107,607 | 9/1870 | Fruen | 235/109 |
| 317,438 | 5/1885 | Burnham | 235/109 |
| 441,095 | 11/1890 | Dutton | 235/109 |
| 451,756 | 5/1891 | Cloudsley | 235/109 |

FOREIGN PATENTS OR APPLICATIONS

| 12,247 | 8/1889 | Great Britain | 235/108 |

Primary Examiner—Richard B. Wilkinson
Assistant Examiner—Stanley A. Wal

[57] ABSTRACT

Three theoretical biorythmic body cycles of different length are normally plotted on charts in graph form. In the invention each cycle is represented by a separate dial with pointer, the pointers being coupled by drive gears of different ratios to the pointer on a master dial.

4 Claims, 5 Drawing Figures

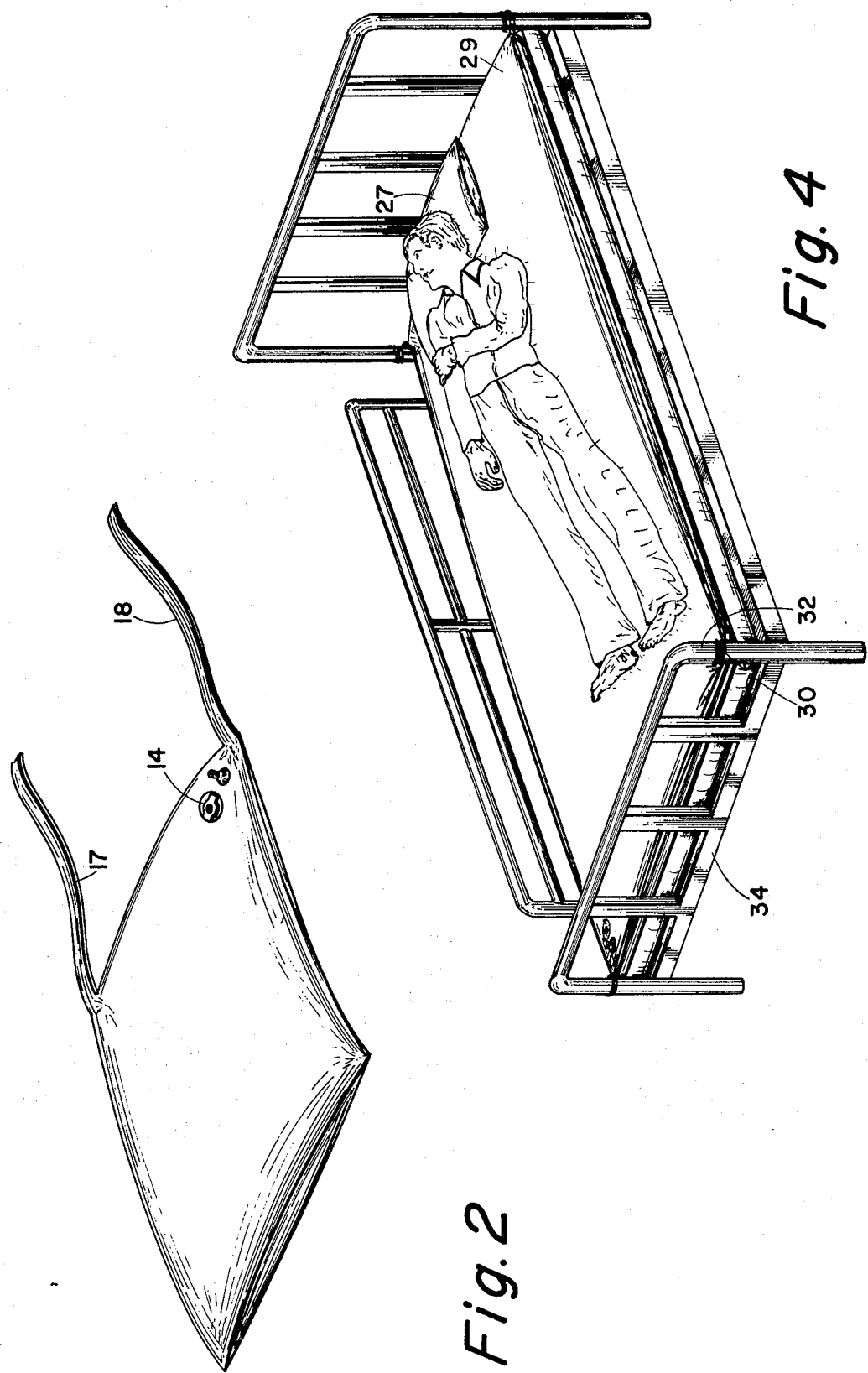

BIORYTHMIC INDICATOR

BACKGROUND OF THE INVENTION

It is known to cast horoscopes for individuals based on his three theoretical body cycles (e.g., *Biorhythm: A Scientific Exploration into the Life Cycles of the Individual*, Hans Wernli, 1961, New York, Crown Publishers).

The first such body cycle, designated the physical or masculine rhythm, has a cycle length of 23 days and represents physical strength, endurance, energy, resistance and confidence. The second body cycle, designated the sensitivity or feminine rhythm, has a cycle length of 28 days and represents emotions such as nerves, feelings, intuition, cheerfulness and creativity. The third body cycle, designated the intellectual rhythm, has a cycle length of 33 days and represents intelligence, logic, memory, mental alertness and judgment.

Normally these cycles are plotted graphically on elongated charts and by observing the relative positions of the respective cyclic line one can determine his intellectual, psychological and physical efficiency on any particular day.

One disadvantage of the prior art chart is the difficulty in determining one's biorhythmic condition at some point in the past or future.

SUMMARY OF THE INVENTION

It is an object of the instant invention to provide a simple and accurate means for determining one's biorhythmic condition for any day whether past, present or future.

Another object of the invention is to provide a biorhythmic indicator which is simple and inexpensive to manufacture and one which is readily utilized by individuals having little knowledge of the biorhythmic theories.

In my invention, the three body cycles or for that matter any number of different cycles of different length can each be represented by a pointer rotated about a properly calibrated dial. The pointers are connected by gearing of different ratios, corresponding to the different lengths of time required by the cycles, to the pointer on a master dial. The master pointer is moved manually or by clockwork to indicate elapsed time whereby the reading at this time for each cycle is indicated by the pointer on the corresponding dial. By virtue of the gearing, the master pointer can be set or reset for any time and all the other pointers will be set or reset accordingly.

The number of cycles, the length of these cycles, the gearing and the like can be determined by the user of the invention who can use same for many purposes other than horoscopes as for example in navigation, biological studies, astronomy, astrology and meteorology.

The nature, principle and utility of the instant invention will become more readily apparent from the following detailed description when read in conjunction with the accompanying drawing.

BRIEF DESCRIPTION OF THE DRAWINGS

In the drawings:

FIG. 2 shows typical gearing used in my invention;

FIG. 4 is a detail view of a pointer used in my invention; and

FIG. 5 is a plan view of my invention.

DETAILED DESCRIPTION OF PREFERRED EMBODIMENTS

Figure 1:
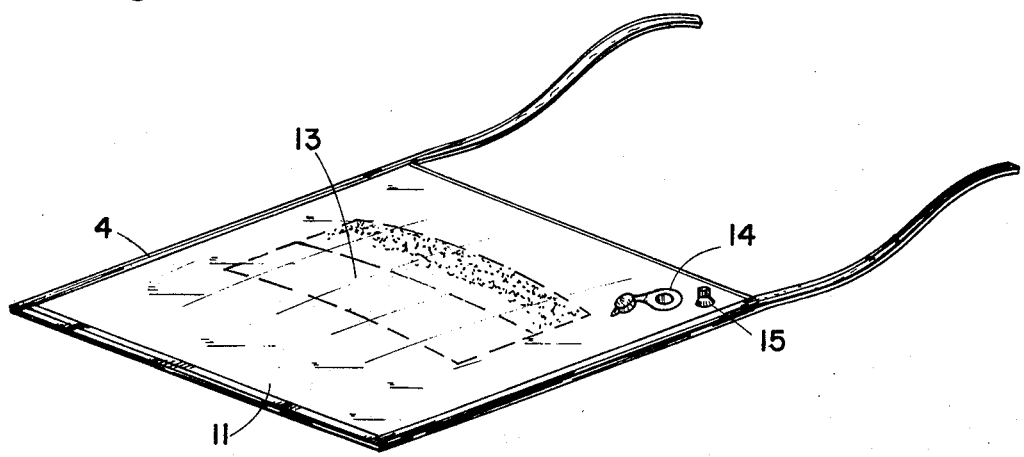
FIG. 1 illustrates prior art charts used in casting horoscopes.

Referring first to FIG. 1, the graph shows an intellectual cycle 10 of 33 days, an emotional cycle 12 of 28 days, and a physical cycle 14 of 23 days. Each cycle has a maximum or peak for the particular state as well as a minimum as shown by the high and low points on the graph, with a linear change as a function of time occurring between maximum and minimum.

With reference to FIG. 5 the biorhythmic indicator generally indicated as 6 includes a face plate 11 having disposed thereon three dials 16, 18 and 20 which represent the three biorhythmic cycles. Each of the dials has evenly disposed on the periphery thereof numerical indica representing a given cycle length. Thus, the first dial 16, which represents the intellectual rhythm, has indicia from 1–33 disposed thereon whereas the second dial 18, representing the feminine rhythm and the third dial 20, representing the masculine rhythm have indicia from 1–28 and 1–23 days, respectively, disposed thereon. Each of the biorhythmic dials 16, 18 and 20 have centrally disposed thereon pointers 22, 24 and 26 cooperating with the indicia on the respective dials. Reference is made to FIG. 4 which clearly shows the configuration of the pointers. It being understood that each of the pointers are of the same configuration as pointer 22 shown in the figure.

Figure 3:
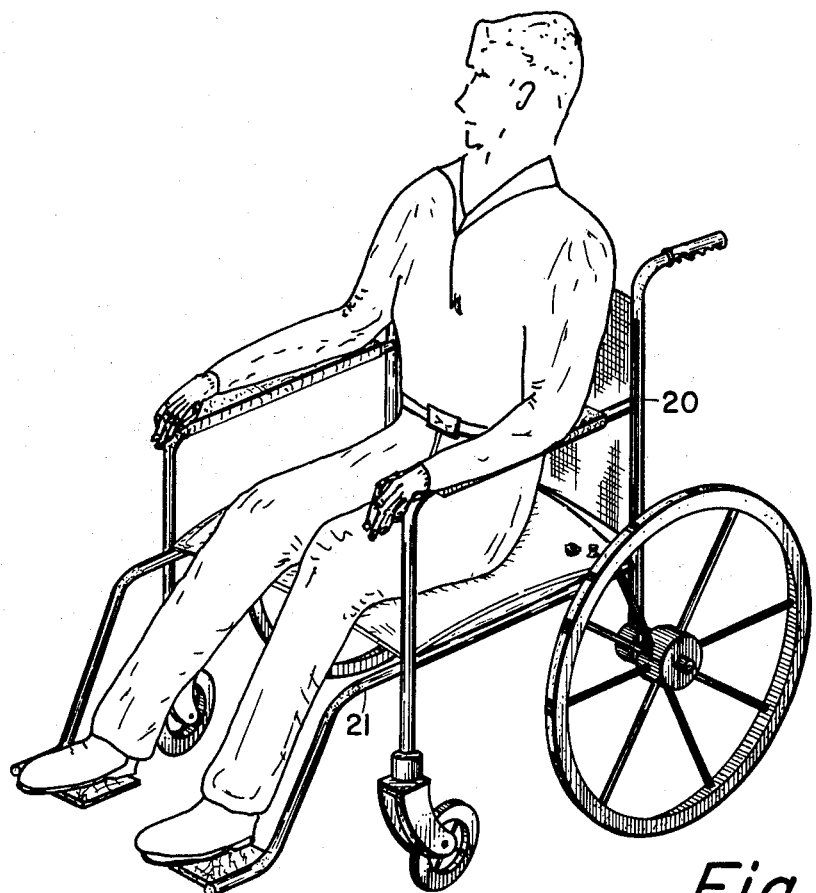
FIG. 3 is a detail view of a split shaft used in my invention.

The pointers 22, 24 and 26 are each mounted on a slotted shaft 32 such as shown in FIG. 3. Each of the shafts has a gear attached thereto as shown in FIG. 2. The gears 34, 35 and 36 are attached to the slotted shaft 32 of the pointers 18, 16 and 20, respectively and have 28, 33 and 23 teeth, respectively. As shown in FIG. 2, the gears 34, 35 and 36 are interconnected by an idler gear 37 which in the illustrated embodiment has 33 teeth.

As shown in FIG. 5 the biorhythmic indicator 6 has a master dial 28 and pointer 30. The dial 28 can be divided into any number of convenient divisions since it functions merely as an indexing dial. As opposed to pointers 22, 24 and 26, the pointer 30, which has a different configuration as shown in the drawing, is mounted on a shaft 32 and has a gear 39 mounted on one end of the shaft having 21 teeth. The gear 39 meshes with an idler gear 38 which meshes with and drives the idler gear 37. Thus, rotation of the master pointer 30 through one increment causes all the other pointers to rotate through one unit step. If all the scale values are calibrated to have the proper initial values for any selected day, all pointers will be locked together and read in proper values and ratios at all times.

Reference dials 42, 40 and 40 enable the user to check on the readings of dials 18, 16 and 20 respectively.

The following 4 steps are necessary to program the biorhythmic indicator for each individual.

1. Determine exactly the total number of days you have lived, right up to the present day. Add one day for every four years of your age to account for leap years.

2. Divide the total number of days by the three numbers as shown.

EXAMPLE:

```
         _____
      28)0000    ← Total number of days
         0000       you have lived
         ____
           00
Set pointer on dial      00
28 at this number  →     00
```

Repeat the process for numbers 33 and 23.

3. Set pointer 30 at number one, holding it to keep it from turning as you set pointers as directed above.

4. By turning pointer 30 one space at a time you will read your daily forecasts. When two or more pointers are vertical or near vertical, be cautious. When two or more arrows are horizontal or near horizontal, have full confidence.

To read the bio-rhythmic indicator in advance, set bottom dials at the same setting as their larger counterparts (these dials are simply reference dials so you won't forget what setting you were at). Now you can turn pointer 30 as far ahead as you want to see what your forecast for the future will be. After you have dialed your future forecast, reset pointers as the reference dials indicate and proceed to read from day to day.

While I have described my invention with particular reference to the drawings, such is not to be considered as limiting its actual scope.

Having thus described this invention, what is asserted as new is:

1. A biorhythm indicator comprising:

a face plate;

a set of circular dials disposed on said face plate, each of said dials bearing scales of varying cycle length calibrated in days and disposed along the periphery thereof;

an additional circular dial disposed on said face plate bearing a scale of predetermined cycle length calibrated in days and disposed along the periphery thereof;

a plurality of split shafts rotatably mounted in the center of each of said circular dials;

pointer means removably mounted on each of said split shafts and cooperating with the scales on each respective dial; and gear means interconnecting said pointer means, said gear means being of the same ratio as the cycle length of said scale whereby movement of the pointer means of said additional circular dial produces synchronous movement of each of the remaining pointer means on said set of circular dials.

2. The indicator of claim 1 wherein said set of circular dials comprises three dials disposed on said face plate and said varying cycle lengths are 33, 28 and 23 days, respectively.

3. The indicator of claim 2 wherein said gear means comprises an individual gear attached to each of said split shafts and a plurality of idler gears interconnecting the individual gears.

4. The indicator of claim 1 wherein said set of circular dials comprises three dials, each of said dials representing a different biorhythm cycle.

* * * * *